United States Patent [19]
Hoege et al.

[11] Patent Number: 6,134,322
[45] Date of Patent: Oct. 17, 2000

[54] ECHO SUPPRESSOR FOR A SPEECH INPUT DIALOGUE SYSTEM

[75] Inventors: Harald Hoege, Gauting, Germany; Andrej Miksic, Maribor, Slovenia

[73] Assignee: Siemens Aktiengesellschaft, Munich, Germany

[21] Appl. No.: 09/012,098

[22] Filed: Jan. 22, 1998

[30] Foreign Application Priority Data

Jan. 22, 1997 [DE] Germany .......................... 197 02 117

[51] Int. Cl.$^7$ ................................................ H04M 1/00
[52] U.S. Cl. .......................................... 379/406; 704/233
[58] Field of Search ........................... 379/406, 408–411, 379/389–392; 704/233, 214, 215, 226–228

[56] References Cited

U.S. PATENT DOCUMENTS

| | | | |
|---|---|---|---|
| 5,852,661 | 11/1999 | Chen | 379/406 |
| 5,978,763 | 11/1999 | Bridges | 379/406 |

FOREIGN PATENT DOCUMENTS

| | | |
|---|---|---|
| 43 17 043 | 11/1994 | Germany . |
| 44 30 189 | 2/1996 | Germany . |
| WO 95/06382 | 3/1995 | WIPO . |

OTHER PUBLICATIONS

"Cancelling of Synthetic Speech for a Real–time Speech Dialogue System," Nagata et al., Proceeding of the Acoustical Society, vol. 1–21 (1992) pp. 145–146.

"Echo Cancelling in Speech Recognition Systems," Pacifici et al., European Conference on Speech Communication and Technology, Madrid, Sep. 1995, pp. 149–152.

"Kompensation akustischer Echos in Frequenzteilbändern," Kellermann, Frequenz, vol. 39, No. 7/8 (1985) pp. 209–215.

Primary Examiner—Wing F. Chan
Attorney, Agent, or Firm—Hill & Simpson

[57] ABSTRACT

In an echo suppressor and a method for the operation thereof in a speech input system, particularly suited for use in speech input systems having extremely long echo paths (approximately 50 ms), an input request of the speech recognition system as well as the incoming speech signal (which has been corrupted by the input request) are fast-Fourier transformed, and the transformed signals are divided into a number of sub-bands in order to estimate corresponding sub-band echo signals. This occurs with individual adaptive filter stages that utilize the NLMS algorithm. Due to the division into sub-bands and a reduction of the number of these sub-bands, the calculating outlay is minimized and the sampling rate can be reduced. The calculating procedure in the estimating of the echo signal part is thus reduced. After estimating the echo signal for the individual sub-bands, the original signal is restored as a superimposition of the individual echo signal components, and the echo signal restored in this way is subtracted from the corrupted speech signal, so that only a pure speech signal is supplied to the feature extraction stage of the speech recognition system.

17 Claims, 2 Drawing Sheets

ECHO SUPPRESSOR FOR A SPEECH INPUT DIALOGUE SYSTEM

BACKGROUND OF THE INVENTION

1. Field of the Invention

The present invention is directed to an echo suppressor for a human/machine dialogue system, the system being of a type wherein a machine produced input request produces any echo signal which corrupts a subsequently-received input speech signal.

2. Description of the Prior Art

By contrast to echo suppression methods that are used in person-to-person transmission systems, wherein echos that occur on the transmission link in telephone calls are suppressed in the central exchanges and wherein acoustic echos that occur in hands-free talking are suppressed, the purpose of an echo suppressor that is utilized in a human/machine dialogue system is to allow the speaker to have a more user-friendly intercourse with the machine. For example, the speaker expresses himself or herself in an input without having to wait for the machine to initiate a system input request (prompt).

Such echo suppressors are known, for example, from the Proceedings of Acoustical Society of Japan Spring Meeting, March 1992, pages 1–21; Y. Nagata et al., "Cancelling of synthetic speech for a real-time speech dialogue system" and from the Proceedings of the European Conference on Speech Communications and Technology, Madrid, September 1995, pages 149 through 152; R. Pacifici et al., "Echo cancelling in Speech Recognition Systems". Adaptive filters are utilized for the suppression of the echo—which would be disturbing in the speech recognition—produced by the input request of the speech input system in order to generate a reproduction or replication of the echo signal and to subtract this from the incoming speech signal. The residual error of the signal is then employed in order to determine the coefficient of the echo suppression vector, by minimizing the quadratic average of the output error. This occurs in time segments in which it is known that no voice signal of the speaker is present.

Such echo suppressors are effective for the purpose of suppressing local-area echos that are generated by the hybrid circuit of the telephone. These known echo suppressors have disadvantages, however, generating replications of echos that arise on long-distance connections in human/machine dialogue systems. In particular, difficulties can arise in making the high calculating capacity, that is needed in order to suppress echos that occur with several 10 ms delay, available fast enough. When, for example, the echo path amounts to 50 ms and the system input request and the received speech signal are sampled with a sampling rate of 8 kHz, then the echo suppressor must implement a filtering with 400 tap locations. Likewise, the adaptation algorithm must implement the updating of the coefficients of the echo suppression vector, with a length of 400 entries, at the sampling rate. In this example, this must occur at 8000 updates per second. The high mathematical complexity of the method and the slow convergence have a disadvantageous effect with respect to the required real-time conditions.

W. Kellermann, "Kompensation akustischer Echos in Frequenzteilbändern", Frequenz, Vol. 39, 1985, Nos. 7–8, pages 209–215, discloses an adaptive sub-band filtering wherein a speech signal is subdivided into a number of under-sampled frequency bands and is subsequently supplied to an NLMS algorithm-based adaptive filter. This sub-band dataset, however, is employed only in order to suppress echos that are produced in a room by a loudspeaker/microphone system to enable better hands-free talking and teleconferencing.

An echo suppressor for human/machine dialogue systems must satisfy certain demands. Its processing of the speech signal should not produce any significant additional calculating outlay for speech recognition. Likewise, a degradation of the recognition performance of the speech recognition system should be avoided.

SUMMARY OF THE INVENTION

An object of the present invention is to provide an echo suppressor for speech input dialogue systems and a method for the operation thereof that do not degrade the speech recognition performance of a speech recognition system and that do not effect any significant additional calculating outlay for the speech recognition.

The above object is achieved in accordance with the principles of the present invention in an echo suppressor for a speech input dialogue system, and to a method for operating an echo suppressor in a speech input dialogue system, wherein the system input request and the input speech signal are each subjected to a fast Fourier transformation, and the respective transformed signals are divided into a number of sub-band signals based on the frequency components of the short-term spectra resulting from the Fourier transformation. The sub-band signals are respectively supplied to a number of adaptive filters, operating in parallel. The respective coefficients of the adaptive filters are formed based on an error signal according to the NLMS algorithm. The full-band signal is then restored from the sub-band signals, and the echo signal, produced by the system input request, is replicated from this full-band signal and is subtracted from the input speech signal, before the input speech signal is supplied to a speech recognition system.

DESCRIPTION OF THE PREFERRED EMBODIMENTS

Figure 1:
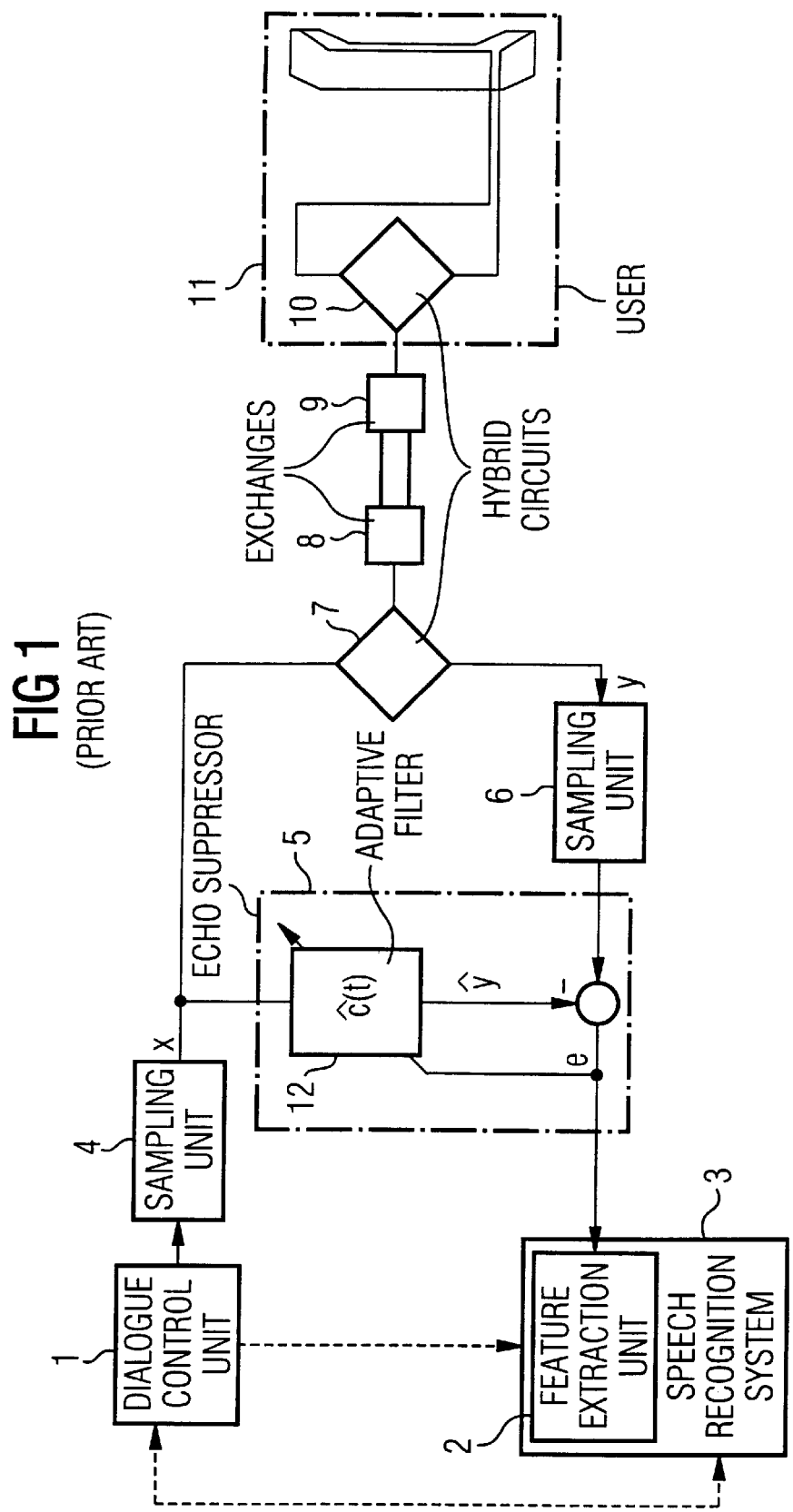
FIG. 1 shows an exemplary embodiment of an echo suppressor known in the prior art.

FIG. 1 shows a telephone-based speech input system that is equipped with an echo suppressor. The block diagram in FIG. 1 shows a human/machine dialogue system with an adaptive echo suppressor. The operation of the human/machine dialogue is thereby controlled by a dialogue control unit 1 which supplies a system input request to a sampling unit 4, as well as controlling an automatic speech recognition system 3. The emitter 4 produces a system input request signal x which reaches the telephone of a user 11 via a hybrid circuit 7 and two exchanges 8 and 9 respectively at both sides of a telephone network and via a hybrid circuit 10 at the user 11. Due to the echos that are generated in the hybrid circuits 7 and 10, a speech signal y that is sampled and supplied to a feature extraction unit 2 of the speech recognition system 3 contains not only the speech signal of the user but also the system input request, which degrades the recognition performance of the speech recognition system 3.

An echo suppressor stage 5 contains an adaptive filter 12 that adaptively sets the echo suppression coefficient c of the echo suppression vector. The adaptive filter 12 functions as a finite impulse response (FIR) filter in this case in order to generate a replication of the echo signal. For filtering out the echo of the input request signal, the output signal 9 of the filter—which corresponds to an approximation of the echo signal—is subtracted in the echo suppressor stage 5 from the received speech signal y. As a result, only the pure speech signal part of the received speech signal is allowed to proceed into the speech recognition system 3. The residual error signal e is employed in order to set the coefficients of the echo suppression vector such that the average of the squared output error is minimized. This occurs in time slices in which it is known that the user does not produce a speech input signal.

Such echo suppressors are suitable for efficiently suppressing local-area echos that are generated by telephone hybrid circuits such as the hybrid circuit 7. These known echo suppressors, however, are characterized by increasing calculating load and slow convergence in the generation of images of the echo ŷ when a system that is operated over long distances is used for the speech input. The wide-area echos that are generated in the hybrid circuit 10 can thereby be delayed by several 10 ms. If, for example, an echo path of 50 ms is present and if the system input requests as well as the received speech signal are sampled with a sampling rate of 8 kHz, then the echo suppressor must implement a filtering employing 400 tap locations. Likewise, the adaption algorithm must implement the coefficients of the echo suppression vector with a length of 400 entries according to the sampling rate. In the selected example, this means that the 400 coefficients must be adapted 8000 times per second.

Figure 2:
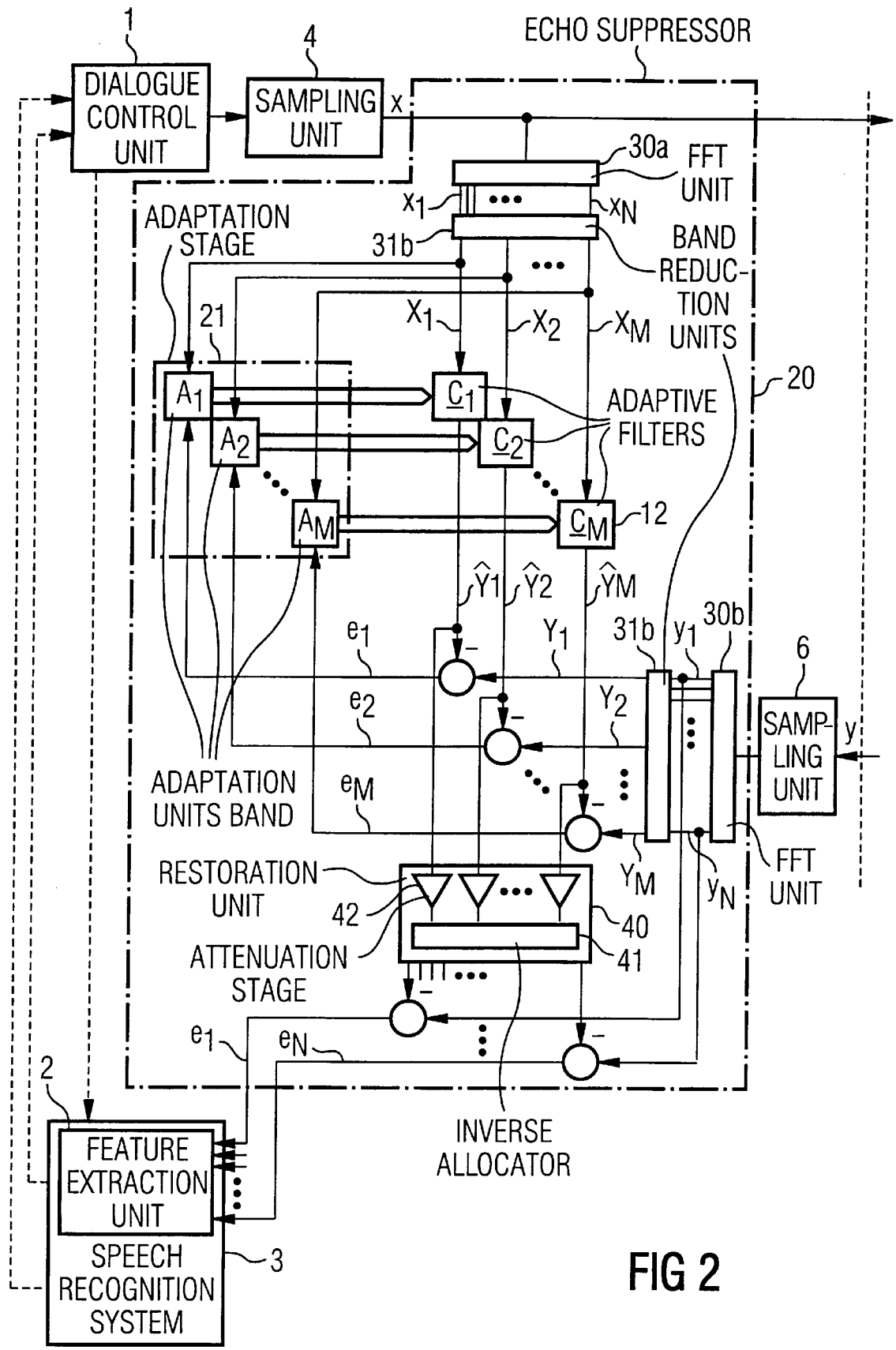
FIG. 2 shows an exemplary embodiment of an inventive echo suppressor.

FIG. 2 shows an exemplary embodiment of an inventive echo suppressor, in the form of a block diagram of an embodiment of an adaptive sub-band echo suppressor 20 for a human/machine telephone dialogue system. A system input request signal x as well as the received speech signal y, after sampling, traverse respective fast Fourier transformation unit 30a and 30b, and resulting in $x_k$ and $y_k$ frequency components (k=1 . . . n). The frequency components $x_k$ and $y_k$ are supplied to respective band reduction units 31a and 31b, resulting in $X_i$ and $Y_i$ sub-band signals (i=1 . . . M; M<N) that have been sampled with a reduced sampling rate. The reduction factor R for the sampling rate is preferably determined from the spacing of neighboring signal frames (channels) in the fast Fourier transformation units 30a and 30b.

The vectors of the sub-bands are supplied into M parallel adaptive filters 12, respectively having filter coefficients $c_1 \ldots c_m$. An adaptation stage 21 contains adaptation units $A_1 \ldots A_M$ respectively connected to the parallel filters 12, which implement the adaption of the adaptive filters 12 according to the NLMS algorithm as described in the aforementioned Kellermann article. This sub-band structure in the echo suppressor 26 has the advantage that the computational complexity of the problem is significantly reduced since, due to the reduced sampling rate, the convergence in the adaption procedure is achieved faster when the NLMS algorithm is employed for adaption.

In the ideal case, the sampling reduction factor R is selected as large as possible and the number of the channels M for the sub-bands $X_i$ and $Y_i$ is selected according to R and according to the blocking attenuation of the passband of the analysis filters that generate the vectors of the sub-band signals.

Usually, the feature extraction unit 2 of the speech recognition system 3 in a speech input system implements the fast Fourier transformation of the received speech signal x as part of a feature extraction procedure. For this reason, the invention undertakes a division into sub-bands employing fast Fourier transformation in order to generate a vector $X_i$ of sub-bands. In order, however, to reduce the demands on the calculating capacity that are produced by the sub-band echo suppressor 20 and to assure band attenuation limits, as are required for the application of the NLMS adaption filter algorithm in the sub-band division, the band-reduction units 31a and 31b are also provided, with which the number of sub-bands N following the fast Fourier transformation is reduced to M after the band reduction. In this way, the sub-band echo suppressor 20 uses a reduced number of bands M in order to implement the echo suppression. This procedure is inventively permitted since there is no necessity of reconstructing the original signal from the N sub-band signals. The number of sub-band channels can even be selected smaller than the reduction factor R of the sampling rate without impeding the convergence of the NLMS algorithm. In order to conserve the spectral resolution of the received signal, however, the short-term magnitude spectrum of the received signal that is generated by the fast Fourier transformation units 30a and 30b must be supplied to the feature extraction unit 2, so that the influences of the echo energies of each of the n frequency components, i.e. of the magnitude spectrum components, are subtracted. In order to achieve this, a band restoration unit 40 is provided that, using the reduced number N of estimated sub-band echo energies, generates estimated echo influences of each of the N originals, i.e. of the sub-band signals originally entering into the fast Fourier transformation units 30a and 30b.

The technique for generating a smaller number of sub-bands in the units 31a and 31b and the operation of the band restoration unit 40, are described in greater detail below.

In the band reduction unit 31a, an allocation of a set of n frequency components $\{X_j, k=1 \ldots N\}$ to M sub-band signals $\{X_i, i=1 \ldots M\}$ is made, with M<N. The allocation of the indices is determined, for example, by an allocation table i=i(k) that, via the allocation, defines which frequency components $x_k$ are employed for the allocation to the respective sub-band signals $X_i$. The magnitude of the sub-band signals $X_i$ are preferably determined according to the following equation:

$$X_i = \sqrt{\sum_k x_k^2} \qquad (1)$$

The sum is thereby formed over all frequency components $X_k$ that fall into a band i according to the allocation i=i(k) of the allocation table. For example, each sub-band i has a width $w_i$ that corresponds to the number of its frequency components that are replicated into the sub-band $X_i$. When, for example, the frequency components $X_4$, $X_5$, $X_6$ and $X_7$ are combined in a sub-band $X_2$, then the width $w_2$=4 applies. The entry in the allocation would then, for example, read i(4)=i(5)=i(6)=i(7)=2. The allocation can be correspondingly implemented for other frequency bands. The band reduction unit 31b operates identically.

In the band restoration unit 40, for example, the sub-band signals $\hat{Y}_i$ that correspond to the estimated echo magnitudes of the band i pass through an attenuation stage 42 that, for example, multiplies the sub-band signals of the band i with the factor $$\frac{1}{\sqrt{w_U}} \quad (2)$$

whereby $w_i$ is the width of the sub-band, as described above. An inverse allocator 41 that implements the band restoration now reconstructs the original N frequency channels that were originally supplied, according to an inverse allocation relative to the index allocation table with i=i(k). The index allocation i=i(k) is not a bidirectional 1:1 allocation, so that the inverse allocation does not exist in a mathematical sense. Such a "pseudo" inverse allocation suffices for the inventive method, however, since the allocation table i=i(k) unambiguously defines what index i is to be copied onto the different indices k.

The magnitude spectral components $ee_k$(k=1 . . . N) that are supplied to the speech recognizer 3 are thus expressible as $$ee_k = y_k - \frac{\hat{Y}_{i(k)}}{\sqrt{w_{i(k)}}} \quad (3)$$

whereby i(k) indicates the above-described allocation table.

Those skilled in the art will appreciate that the invention can be implemented in hardware as well as in software, the software, for example, operating a digital signal processor. Other embodiments as a mix of hardware and software and firmware can likewise be easily designed and realized by a person skilled in the art.

For example, it is conceivable that only one fast Fourier transformation unit be utilized, which operates very fast and serves both band reduction units 31a and 31b by multiplexing.

Although modifications and changes may be suggested by those skilled in the art, it is the intention of the inventors to embody within the patent warranted hereon all changes and modifications as reasonably and properly come within the scope of their contribution to the art.

We claim as our invention:

1. An echo suppressor for a speech input dialogue system, said speech input dialogue system producing a system input request and receiving an input speech signal, said echo suppressor comprising:

fast Fourier transformation means for fast Fourier transforming each of said system input request and said input speech signal for producing a short-term magnitude spectrum of said system input request and a short-term magnitude spectrum of said input speech signal, each of said short-term magnitude spectra being comprised of frequency components;

band reduction means, supplied with said short-term magnitude spectrum of said system input request and said short-term magnitude spectrum of said input speech signal, for dividing said short-term magnitude spectrum of said system input request into a first set of sub-band signals based on said frequency components of said short-term magnitude spectrum of said system input request, and for dividing said short-term magnitude spectrum of said input speech signal into a second set of sub-band signals based on said frequency components of said short-term magnitude spectrum of said input speech signal;

a plurality of adaptive filters, supplied with said first set of sub-band signals, for simulating a pulse response of a line echo, produced by said system input request, on a path traversed by said input speech signal, said plurality of adaptive filters respectively having adaptation coefficients;

adaption means for adapting said adaptation coefficients dependent on respective outputs of said adaptive filters and on said second set of sub-band signals;

band restoration means, supplied with said outputs of said plurality of adaptive filters, for restoring a full-band signal from said outputs of said plurality of adaptive filters to replicate said line echo; and subtraction means for subtracting said replicated echo from said short-term magnitude spectrum of the input speech signal.

2. An echo suppressor as claimed in claim 1 wherein said band reduction means comprises means for grouping the frequency components of said short-term magnitude spectrum of said system input request in forming said first set of sub-band signals, and for grouping the frequency components of said short-term magnitude spectrum of said input speech signal in forming said second set of sub-band signals.

3. An echo suppressor as claimed in claim 1 further comprising first sampling means for sampling said system input request at a first sampling rate and second sampling means for sampling said input speech signal at said first sampling rate, and further sampling means for sampling each of said first and second sets of sub-band signals at a second sampling rate which is less than said first sampling rate.

4. An echo suppressor as claimed in claim 3 wherein said second sampling rate is less than said first sampling rate by a sampling reduction factor, and wherein a number of sub-bands in each of said first and second sets of sub-bands is less than said sampling reduction factor.

5. An echo suppressor as claimed in claim 3 wherein said fast Fourier transformation means comprises said further sampling means.

6. An echo suppressor as claimed in claim 5 wherein said second sampling rate is lower than said first sampling rate by a sampling reduction factor of 80, wherein said first sampling means has a sampling rate of 8 kHz, and wherein said fast Fourier transformation means has a length of 1 to 8 and wherein a number of sub-bands in each of said first and second sets of sub-bands is 24.

7. An echo suppressor as claimed in claim 1 wherein said fast Fourier transformation means produces frequency components $x_k$ of said system input request and $y_k$ of said input speech signal, with k=1 . . . N, and wherein said band reduction means comprises an allocation table i=i(k) and means for producing said first set of sub-band signals $x_i$ according to $$X_i = \sqrt{\sum_k x_k^2}$$

and means for producing said second set of sub-band signals $Y_i$ according to $$Y_i = \sqrt{\sum_k y_k^2}$$

wherein i=1 . . . M, M<N.

8. An echo suppressor as claimed in claim 7 wherein said outputs of said adaptive filters comprise $\hat{Y}_i$, with i=1 . . . M, and wherein said band restoration means comprises means for respectively multiplying said outputs $\hat{Y}_i$ by respective coefficients $$\frac{1}{\sqrt{w_i}}$$

wherein $w_i$ is a width of sub-band i equal to a number of spectra combined in said sub-band i, by conducting a reverse allocation relative to an allocation performed by said allocation table in said band reduction means.

9. An echo suppressor as claimed in claim 1 further comprising a speech recognition system to which an output of said subtraction means is supplied.

10. An echo suppression method for a speech input dialogue system, said speech input dialogue system producing a system input request and receiving an input speech signal, said method comprising the steps of:

fast Fourier transforming each of said system input request and said input speech signal for producing a short-term magnitude spectrum of said system input request and a short-term magnitude spectrum of said input speech signal each of said short-term magnitude spectra being comprised of frequency components;

band reducing said short-term magnitude spectrum of said system input request and said short-term magnitude spectrum of said input speech signal, by dividing said short-term magnitude spectrum of said system input request into a first set of sub-band signals based on said frequency components of said short-term magnitude spectrum of said system input request, and for dividing said short-term magnitude spectrum of said input speech signal into a second set of sub-band signals based on said frequency components of said short-term magnitude spectrum of said input speech signal;

simulating, in a plurality of adaptive filters supplied with said first set of sub-band signals, a pulse response of a line echo, produced by said system input request, on a path traversed by said input speech signal, said plurality of adaptive filters respectively having adaptation coefficients;

adapting said adaptation coefficients dependent on respective outputs of said adaptive filters and on said second set of sub-band signals;

restoring a full-band signal from said outputs of said plurality of adaptive filters to replicate said line echo; and subtracting the replicated echo from said short-term magnitude spectrum of said input speech signal.

11. A method as claimed in claim 10 wherein the steps of band reducing comprises grouping the frequency components of said short-term magnitude spectrum of said system input request in forming said first set of sub-band signals, and grouping the frequency components of said short-term magnitude spectrum of said input speech signal in forming said second set of sub-band signals.

12. A method as claimed in claim 10 comprising the additional steps of sampling said system input request at a first sampling rate and sampling said input speech signal at said first sampling rate, and sampling each of said first and second sets of sub-band signals at a second sampling rate which is less than said first sampling rate.

13. A method as claimed in claim 12 wherein said second sampling rate is less than said first sampling rate by a sampling reduction factor, and wherein a number of sub-bands in each of said first and second sets of sub-bands is less than said sampling reduction factor.

14. A method as claimed in claim 13 wherein said second sampling rate is lower than said first sampling rate by a sampling reduction factor of 80, wherein said first sampling rate is 8 kHz, and wherein the fast Fourier transformation has a length of 1 to 8 and wherein a number of sub-bands in each of said first and second sets of sub-bands is 24.

15. A method as claimed in claim 10 wherein the fast Fourier transformation produces frequency components $x_k$ of said system input request and $y_k$ of said input speech signal, with k=1 . . . N, and wherein the step of band reducing comprises employing an allocation table i=i(k) for producing said first set of sub-band signals $x_i$ according to $$X_i = \sqrt{\sum_k x_k^2}$$

and for producing said second set of sub-band signals $Y_i$ according to $$Y_i = \sqrt{\sum_k y_k^2}$$

wherein i1 . . . M, M<N.

16. A method as claimed in claim 15 wherein said outputs of said adaptive filters comprise $\hat{Y}_i$, with i=1 . . . M, and wherein the step of restoring comprises respectively multiplying said outputs $\hat{Y}_i$ by respective coefficients $$\frac{1}{\sqrt{w_i}}$$

wherein $w_i$ is a width of sub-band i equal to a number of spectra combined in said sub-band i, by conducting a reverse allocation relative to an allocation performed by said allocation table in the step of band reducing.

17. A method as claimed in claim 10 comprising the additional step of supplying a result of the step of subtracting to a speech recognition system.

* * * * *